Feb. 28, 1950 D. A. QUARLES 2,499,000
FREQUENCY MODULATION SYSTEM FOR LOCATING
IMPEDANCE IRREGULARITIES
Filed Oct. 16, 1946

INVENTOR
D. A. QUARLES
BY
N. D. Ewing
ATTORNEY

Patented Feb. 28, 1950

2,499,000

UNITED STATES PATENT OFFICE 2,499,000

FREQUENCY MODULATION SYSTEM FOR LOCATING IMPEDANCE IRREGULARITIES

Donald A. Quarles, Englewood, N. J., assignor to Bell Telephone Laboratories, Incorporated, New York, N. Y., a corporation of New York Application October 16, 1946, Serial No. 703,517

7 Claims. (Cl. 175—183)

This invention relates in general to electrical transmission and more specifically to systems and methods for locating and measuring impedance irregularities in transmission lines.

In accordance with one prior technique, sources of impedance irregularities in transmission lines were located by a laborious procedure which included measuring the impedance of the line at a number of different frequencies to which the impressed oscillations were manually varied, plotting the resulting data, and determining the distance to the irregularity by computations from such graphs. By means of pulse systems which utilize a cathode ray viewing device, line irregularities may be located and measured directly in terms of the transit times of echoes reflected therefrom. One disadvantage of the echo pulse technique is the confusion which may result when a number of irregularities are present in the test line thereby producing a multiplicity of echoes. Another possible disadvantage of this method is that it is not well adapted for automatic recording of the location of irregularities if that be desired.

A type of fault locating system overcoming the disadvantages mentioned and certain other disadvantages inherent in prior art systems is disclosed and claimed in application, Serial No. 703,622, filed by E. I. Green of even date herewith. The system presented in the Green application utilizes a frequency modulation echo method for the location and measurement of impedance irregularities in transmission lines. In its simplest form this method comprises transmitting a frequency modulated electromagnetic wave through the line and beating the reflected echo waves received from a succession of irregularities against the transmitted wave. An important feature of Green's invention is that the line may be scanned by either varying the modulating frequency of the transmitted wave or the detected beat frequency, so that an irregularity corresponding to each particular distance, if present, may be detected in sequence to the exclusion of other irregularities.

A limitation which arises in frequency modulation systems of the type described for location and measurement of impedance irregularities on transmission lines is the relatively narrow frequency sweep permissible on such lines and the extremely short echo time involved.

It is a broad object of the present invention to improve frequency modulating systems. A more specific object of the invention is to overcome limitations such as pointed out in the foregoing paragraph which may arise in frequency modulating systems for the location and measurement of impedance irregularities in transmission lines.

It is proposed in accordance with one embodiment of the present invention to introduce a variable phase shift between the modulating sawtooth envelopes of two substantially identical frequency modulated signals, one of which is impressed on a line under test and the other of which serves as a reference signal. The portion of the impressed signal which is reflected from irregularities in the line under test is combined in a modulator circuit with the reference signal, the resultant beat frequency being passed through an intermediate filter of fixed frequency and the output therefrom utilized to operate an indicating meter. Irregularities are located by varying the phase shift between the two transmitted signals until a deflection occurs in the meter and by then reading the distance to the fault on a calibrated scale associated with the phase shifter.

In accordance with a modified embodiment, the indicating meter is replaced by a cathode ray oscilloscope, on the screen of which the echoes corresponding to irregularities in the line may be displayed panoramically as bright lines along an axis calibrated in terms of distance.

For the purposes of illustration, the present invention will be shown in the drawings and described in the specification hereinafter in the form of several embodiments adapted for the location and measurement of impedance irregularities in transmission lines, including coaxial cables, conventional cable pairs and open wire lines. However, it is to be understood that the invention is not limited to such applications as are specifically described herein but may be adapted for other purposes in other types of frequency modulation systems as will be apparent to those skilled in the art.

Other objects and advantages of this invention will be apparent from a study of the specification as set forth hereinafter and the attached drawings, in which:

Fig. 1A shows frequency plotted against time for (a) the transmitted signal and (b) the reflected signal in a frequency modulation system for locating impedance irregularities such as disclosed in the application of E. I. Green, supra;

Figure 3:
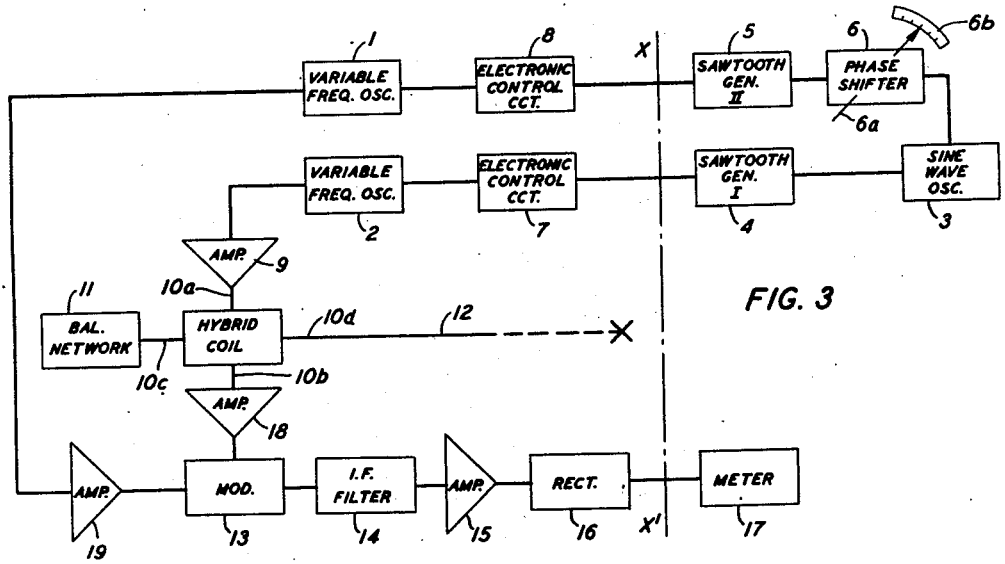
Figure 4:
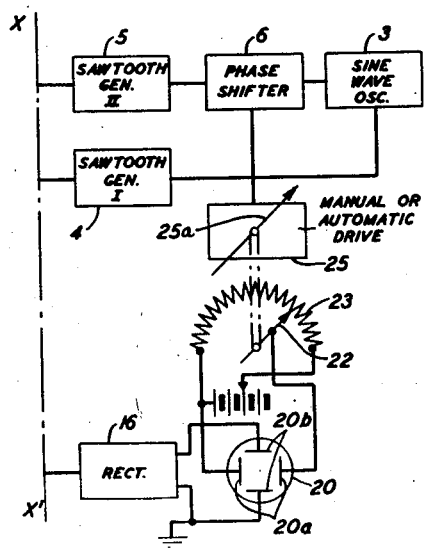

Fig. 3 shows schematically one embodiment of the frequency modulation system of the present invention wherein the distance to the irregularity may be determined in terms of the phase differential between the modulating envelopes of a signal reflected from the irregularity and a reference signal which signals are combined in a modulating circuit; and Fig. 4 shows a modification of the system of Fig. 3 in which a cathode ray oscilloscope is substituted for the indicating meter.

In locating impedance irregularities in transmission lines by the frequency modulation echo technique of the present invention, it is possible to sweep the measuring frequency over only a comparatively narrow band. For a better understanding of the requirements for such a system, consideration will first be given to the distances over which measurements are needed on repeatered transmission lines and the possible range and location of the frequency sweep. The minimum distance for which location of irregularities is necessary is less than half a repeater section and preferably as short a distance as possible. Short distances which it is not possible to measure from one end of the line, frequently can be measured from the other end. The frequency range swept over is limited by flatness of line delay. In general, the velocity is more nearly uniform the higher the frequency. However, a higher mid-frequency without correspondingly wider sweep increases the effect of error in the frequency modulating oscillator. Also, the line attenuation is greater at higher frequencies necessitating greater receiving gain and making noise limitations more severe. On the other hand, it may be desirable, particularly in case of a coaxial system, to use frequencies approaching the top of the carrier band in order to locate small reactance irregularities.

For the purposes of illustration, the table below lists several common types of transmission line systems, showing in each case, (1) a possible distance range for operation of an impedance irregularity locating system in accordance with the present invention; (2) possible values for the mean carrier frequency and approximate upper and lower limits of modulating frequency sweep; and (3) the velocity of signal travel.

Table

|  | Distance Range, Mi. | | Freq. Sweep, Kc./sec. | Velocity, Mi./sec. |
| --- | --- | --- | --- | --- |
|  | d min. | d max. | | |
| Coaxial cable | 1 | 5 | 500±100 | 180,000 |
| Conventional cable pairs | 5 | 20 | 50±5 | 125,000 |
| Open wire lines | 25 | 100 | 60±15 | 180,000 |

The application of E. I. Green, supra, discloses in one embodiment a type of system adaptable for this purpose which utilizes a variable sawtooth modulating frequency and a fixed beat frequency. In a system of this type the line is tested by varying the frequency of the modulating saw-tooth envelope of the transmitted signal which is divided into two components, one being impressed on the test line, and the other being conducted directly to a modulating circuit. The beat frequency resulting from the combination of the reference signal and a fault-reflected signal is fed through a fixed-frequency filter to a meter in which the presence of current maxima may be observed corresponding to variations in the saw-tooth frequency.

For some purposes, especially in studying reactance irregularities, it may be found advantageous to make several measurements at more than one location for the sweep range.

Figure 1A:
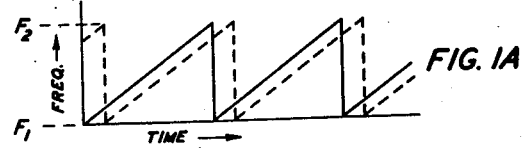
Fig. 1B shows frequency plotted against time for the beat frequencies resulting from the superposition of the transmitted and reflected signals indicated in Fig. 1A.
Figure 1B:
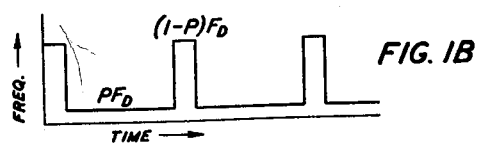

The operation of such a system will be better understood by referring to Figs. 1A and 1B of the drawings, and from a study of the following theoretical considerations.

Let the frequency modulating oscillator be swept between a minimum frequency $F_1$ and a maximum frequency of $F_2$, the difference between these two limits being designated $F_D$.

Assume that the oscillator is swept by means of a saw-tooth generator whose rate is $F_S$. The period for one cycle of the saw-tooth is then $$T_S = \frac{1}{F_S} \qquad (1)$$

If the frequency modulated wave is reflected from a point at a distance $d$, the echo wave is delayed by the interval $$T_R = \frac{2d}{V} \qquad (2)$$

where $V$ is the velocity of propagation. Let the ratio $T_R/T_S$ be designated $\rho$. Then $$F_s = \rho \frac{V}{2d} \qquad (3)$$

Now if the echo wave is beaten against the transmitted wave, two different beat frequencies are produced during one cycle of the saw-tooth, as will be apparent from Figs. 1A and 1B. The sum of these two frequencies is equal to the frequency difference $F_D$. The lower beat frequency is:

$$F_L = \rho F_D \qquad (4)$$

while the higher one is:

$$F_U = (1-\rho) F_D \qquad (5)$$

The lower frequency is present during the part of the cycle represented by $1-\rho$, while the higher frequency is present during the remainder of the cycle. When the value of $\rho$ is 0.5, the two beat frequencies become identical and equal to $$\frac{F_D}{2}$$

In using a circuit of the variable saw-tooth fixed beat frequency type, an intermediate frequency filter connected to the beat frequency modulator output may be assigned a frequency $F_D/2$, corresponding to $\rho=0.5$. Alternatively this filter may be assigned to some other frequency in which case there are two possibilities:

(a) Only the lower beat frequency may be employed. This is particularly desirable when $\rho$ is very small, so that the lower beat frequency is present during most of the cycle. Small nicks are then cut out of this frequency at the sawtooth rate.

(b) The two beat frequencies may be employed conjointly. If a frequency equal to $F_D$ is added to the beat frequency modulator, the upper beat frequency modulates with this to produce the lower (or vice versa).

Analysis of the relationship involved in the methods of Fig. 1A shows that the relatively narrow frequency sweep permissible on wire lines and the extremely short echo times involved introduce two limitations which tend to restrict the working range. On the one hand, it is desirable that the beat frequency be large so that the effect of non-linearity in the frequency modulating oscillator will be small. On the other hand, a larger value of beat frequency means a correspondingly greater saw-tooth rate. However, it is desirable that the maximum saw-tooth rate be small in comparison with the total frequency sweep, or, in other words, that the modulation index should be large. The physical reason for this is that, as the modulation index becomes small, side frequencies are produced which result in spurious responses in the receiving equipment. The desirable limit for the ratio of frequency sweep to the saw-tooth rate is not known but, unless special receiving equipment is provided, this ratio should be around 100.

An alternative to the variable saw-tooth fixed beat frequency system discussed is a fixed saw-tooth variable beat frequency system also disclosed in the Green application, supra. In accordance with the present invention, the purpose of which is to overcome limitations of the previously described systems, both the saw-tooth frequency and the beat frequency are held constant. However, two saw-tooth waves differing in phase are generated, one of these being used to frequency modulate the transmitted wave and the other to produce a separate frequency modulated wave which beats with the echo wave reflected from an impedance irregularity in the test line. The distance range is covered by varying the phase relation between the two saw-tooth waves.

Figure 2:
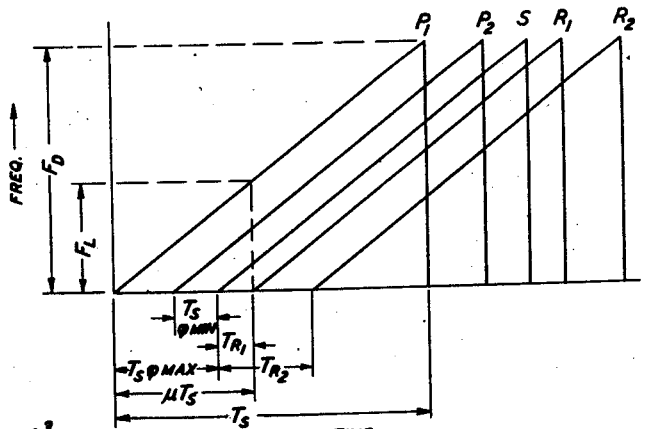
Fig. 2 illustrates diagrammatically the operation of the variable-phase frequency-modulation system of the present invention by a plotting of frequency against time for (a) the initially transmitted waves, (b) corresponding reflected waves, and (c) phase shifted waves for irregularities at minimum and maximum points in the distance range.

The advantages of such a system will be better understood from the following theoretical considerations. Referring to Fig. 2, let the ratio $T_R/T_S$ be represented by $\rho$ as hereinbefore, where $T_S$ = the period of one cycle of the saw-tooth wave, and $T_R$ = the interval of delay of the echo wave.

Evidently then $$\rho_{max.} = \frac{T_{R max.}}{T_S} \quad (6)$$

and $$\rho_{min.} = \frac{T_{R min.}}{T_S} \quad (7)$$

Now let the ratio $F_L/F_D$ (lower beat frequency divided by frequency sweep) be designated $\mu$, where $\mu \leqq 0.5$. Let the phase shift between the transmitted saw-tooth wave and the one applied to the receiver, when expressed as a fraction of one saw-tooth cycle, be designated $\Phi$. The maximum and minimum values of phase shift are $\Phi_{max.}$ and $\Phi_{min.}$.

The relationships between the different waves are sketched in Fig. 2 in which the transmitted saw-tooth is designated S, the two echo waves corresponding to irregularities at distances $d_{min.}$ and $d_{max.}$ are designated $R_1$ and $R_2$, respectively, while the two corresponding phase shifted waves are marked $P_1$ and $P_2$, respectively.

Referring to Fig. 2 it is evident that $$T_{R_1} + \Phi_{max.} \cdot T_S = \mu T_S \quad (8a)$$
$$T_{R_2} + \Phi_{min.} \cdot T_S = \mu T_S \quad (8b)$$

whence $$\rho_{min.} + \Phi_{max.} = \mu \quad (9a)$$
$$\rho_{max.} + \Phi_{min.} = \mu \quad (9b)$$

From this it follows that $$\Phi_{max.} - \Phi_{min.} = \rho_{max.} - \rho_{min.} \quad (10)$$

Since $\rho$ cannot exceed 0.5 it follows that $$\Phi_{max.} \leqq (0.5 - \rho_{min.}) \quad (11)$$

If $\Phi_{min.}$ is made equal to zero, then $$\Phi_{max.} = \rho_{max} - \rho_{min.} \quad (12)$$

From (11) and (12) it follows that $$\rho_{max} \leqq 0.5 \quad (13)$$

The variable phase system of the present invention has an advantage over the variable frequency systems hereinbefore described, in that one is enabled in such a system to select the saw-tooth rate and then more or less independently choose the value of beat frequency.

For reasons previously stated, the ratio $F_D/F_S$ frequency sweep to saw-tooth frequency should be large, of the order of 100. However, the larger the value of this ratio, the narrower is the range of phase shift, and the greater the error due to phase shift. The working range should preferably lie between these requirements.

Having selected a value of saw-tooth rate, the value of $\mu$ may then be chosen. In general, $\mu$ should be fairly large so as to give a higher beat frequency and minimize the effect of error due to the frequency modulated wave. The effect of such an error is, however, less important than might otherwise appear, since the error can to some extent be calibrated out.

Fig. 3 of the drawings shows one embodiment of a frequency modulation system in accordance with the present invention, which is adapted to measure the distance to an impedance irregularity on a line in terms of a phase differential between the modulating envelopes of the transmitted and reflected signals. Two generators 1 and 2 of electromagnetic oscillations of substantially identical character and frequency, and of such a range of frequencies as discussed hereinbefore, are adapted to have their respective frequency outputs periodically swept over a given range in a manner which varies linearly with time in response to the saw-tooth output voltages of respective modulating circuits which include the following elements. The conventional sine wave generator 3, which serves as a source of synchronizing oscillations, has parallel output circuits, one of which is connected directly to the saw-tooth generator 4, and the other of which is connected to the saw-tooth generator 5 through a series circuit which includes the variable phase shifter 6. The saw-tooth generators 4 and 5, which are controlled by voltages derived from the oscillator 3, may comprise relaxation oscillators of any of the types well known in the art adapted to generate identical periodic saw-tooth voltages which increase linearly with time, while the phase shifter 6 may comprise one of the conventional types adapted to introduce predetermined phase delays between zero and 90 degrees in the impressed sine wave oscillations from the generator 3. The phase shifter 6 should preferably have a relatively flat attenuation characteristic over the utilized ranges of frequency and phase angles. The relative phase delay introduced by the phase shifter 6 is varied by means of the slider 6a which moves on a scale 6b calibrated in terms of distance. The output of the saw-tooth generator 4 is connected through a series circuit including the electronic control circuit 7 to the input of the variable frequency oscillator 2, while the output of the saw-tooth generator 5 is connected through the corresponding electronic control circuit 8 to the input of the variable frequency oscillator 1. The electronic control circuits 7 and 8 may comprise so-called reactance tube circuits of the type shown in Fig. 6, p. 1133, and described by C. Travis, in an article entitled Automatic frequency control, Proceedings of the Institute of Radio Engineers, vol. 23, No. 10, October 1935. The reactance tube circuits 7 and 8 are responsive to the varying magnitude of the saw-tooth voltages applied to their respective inputs to vary the reactances of the tuned circuits of the oscillators 1 and 2 to which they are respectively coupled, thereby frequency modulating the output signals of the oscillators 1 and 2. To those skilled in the art it will be apparent that well-known mechanical means for frequency modulating the outputs of the oscillators 1 and 2 may be substituted for the electronic means herein disclosed.

The frequency modulated output voltage of the variable frequency oscillator 2 is connected through the conventional amplifier 9 to the input terminals of a hybrid coil 10 having four sets of terminals. The hybrid coil 10, of a type well-known in the art, such as described, for example, on page 524 of "Magnetic Circuits and Transformers" by members of the Electrical Engineering Staff of Massachusetts Institute of Technology, John Wiley & Sons, 1943, is so arranged that the output circuit 10b presents a high impedance to signals impressed on the input circuit 10a, causing the input energy to divide equally between the collateral branches 10c and 10d. The branch 10d is connected to the line 12 while the opposite branch 10c is connected to a conventional balancing network 11 which has impedance characteristics similar to those of the line 12 when in normal operating condition with no appreciable irregularities present. Energy reflected from an irregularity in the line 12 causes a potential to be impressed on the output terminals 10b and hence on the input of the conventional modulating circuit 13 through the series connected amplifier 18.

The output voltage of the variable frequency oscillator 1, which, as pointed out hereinbefore, is preferably identical in frequency and form to the output voltage of the variable frequency oscillator 2, is fed into the input of the modulating circuit 13 through the amplifier 19 so that the reflected energy from the line 12 is superposed on or beaten against the phase-shifted transmitted signal from the oscillator 1. This produces a beat note, the frequency of which depends on both the distance to the impedance irregularity 12a and the phase differential which is introduced between the modulating saw-tooth envelopes of the two frequency modulated waves by means of the variable phase-shifter 6. The beat frequency output of the modulator 13 is then passed through the band-pass filter 4 which performs the function of filtering out a predetermined fixed beat frequency which may be of the order of from 10 to 50 times the chosen saw-tooth frequency, the output from the filter 14 being fed through the conventional amplifying circuit 15 and the rectifying circuit 16 to a current indicating device 17 such as an ammeter. Thus, the test line is scanned by either manually or automatically varying the phase differential introduced by the phase-shifter 6 between the modulating envelopes of the frequency modulated output signals of the oscillators 1 and 2 through a certain range of values until reflected energy from a line irregularity 12a produces the particular beat frequency to which the fixed frequency filter 14 is responsive, thereby causing a deflection of the meter 17. The variable phase-shifter 6 has an attached wiper 6a which moves over a scale 6b calibrated in terms of distance, so that by successively changing the adjustment of the phase-shifter 6 one may effectively focus on each irregularity in succession to the exclusion of other irregularities. The relative magnitudes of different impedance irregularities will be indicated by the corresponding magnitudes of the currents recorded in the indicating device 17 (making due allowance for line attenuation) and the system may be calibrated for absolute magnitude by inserting an irregularity of known value.

Instead of successively observing the impedance irregularity indications on the meter 17, as provided in the circuit of Fig. 3, a complete picture may be provided on the screen of a cathode ray oscilloscope as shown in Fig. 4 of the drawings. For this purpose the filtered and rectified beat frequency output is impressed on the vertical deflecting plates of the oscilloscope, and a sweep voltage synchronous with the variations in the phase differential between the two saw-tooth signals is impressed on the horizontal deflecting plates. Referring to Fig. 4, the circuit there shown may be considered as replacing that portion of Fig. 3 to the right of the line X—X', the circuit elements being the same to the left of the line X—X' as hereinbefore described with reference to Fig. 3. The output current of the rectifier 16 is connected to the vertical deflecting plates 20a of the cathode ray oscilloscope 20. The horizontal deflecting plates 10b of the cathode ray oscilloscope 20 are connected to a sweep circuit which is synchronized with the relative variations in phase between the saw-tooth oscillations of the generators 4 and 5. The driving mechanism 25, which may comprise a motor for automatically driving the phase shifter 6 through a predetermined range of phase shifts or which may correspond to the device 6a for manually varying the phase-shifter 6, is mechanically coupled to the slider 22 on the potential divider 23 which is connected to the horizontal deflecting plates 21. Through the operation of this circuit all the line irregularities at various distances within a given range are displayed on the screen of the oscilloscope 19 as vertical lines along a horizontal axis calibrated in terms of their respective distance from the test line terminal.

It will be apparent to those skilled in the art that other embodiments than the several herein described are within the scope of the present invention; and it is to be understood that the present invention is not limited to the use of any of the particular circuits or apparatus shown.

What is claimed is:

1. A system for locating and detecting the magnitude of impedance irregularities in transmission lines, comprising in combination a source of oscillations, a first and a second linear saw-tooth generator connected for synchronization by said source, means comprising a variable phase shifter connected to introduce a phase shift in the oscillations of one said saw-tooth generator with respect to the second said sawtooth generator, a first and a second variable frequency carrier oscillator, a first and a second control means, said first control means connected to said first carrier frequency oscillator and said first saw-tooth generator, and said second control means connected to said second carrier frequency oscillator and said second saw-tooth generator, said first and second control means constructed to modulate the respective frequency outputs of said first and second carrier oscillators in accordance with the output voltages of said first and second saw-tooth generators, a beat frequency modulator, said first carrier frequency oscillator connected directly to said beat frequency modulator, a hybrid coil having input and output terminals in conjugate relation and a third terminal, the input terminal of said hybrid coil connected to said second carrier oscillator, the third terminal, of said hybrid coil connected to the transmission line under test, the output terminals of said hybrid coil being connected to said beat frequency modulator, whereby an unreflected saw-tooth frequency modulated wave is beaten with a reflected sawtooth frequency modulated wave to produce a beat frequency wave, a filter connected to pass a selected beat frequency of said modulator, and a current indicating device connected to said filter, whereby the phase of said phase-shifter can be varied until a deflection occurs in said indicating device in response to current passing through said filter from said beat frequency modulator.

2. A system in accordance with claim 1 in which a scale is attached to said variable phase-shifter, said scale being calibrated in terms of distance whereby when said indicating device records a current deflection, the distance to an irregularity in the line under test may be read off said scale.

3. A system in accordance with claim 1 in which said current indicating device is replaced by a cathode ray oscilloscope having an indicating screen, a source of a beam of electrons, and respective horizontal and vertical deflectors, one of said deflectors being connected to the output of said filter and the other of said deflectors being connected to a second saw-tooth generator, means connected to said second saw-tooth generator for synchronizing the instantaneous voltage thereof with the variations in said phase-shifter whereby the locations of the irregularities on said test line are displayed on said screen.

4. A frequency modulation system for determining the distance to a designated impedance irregularity which comprises in combination a source of carrier frequency oscillations, means for impressing a frequency modulation envelope on the oscillations of said source, means for transmitting a component of said frequency modulated oscillations in the direction of said impedance irregularity, means comprising a modulator circuit for combining the component of said oscillations reflected from said impedance irregularity with an unreflected component of said oscillations, and means for selectively detecting the resultant beat frequency from said modulating circuit, characterized in this, that a variable phase-shifter is cooperatively connected to said means for impressing a frequency modulation envelope on the oscillations of said source whereby to introduce a phase differential between the modulating envelopes of said reflected and said unreflected oscillation components, thereby to measure said distance in terms of said phase differential.

5. A system for locating irregularities in transmission lines which comprises in combination means for producing a pair of frequency modulated signals, means for introducing a variable phase shift between the modulating envelopes of said signals, means for impressing one of said signals on a test transmission line, means comprising a modulating circuit for combining the portion of said signal reflected from an irregularity on said line with the second of said signals, means for selectively detecting a predetermined beat frequency from said modulating circuit, and means for determining the variations in said phase shift.

6. A system for locating impedance irregularities in transmission lines which comprises in combination means for producing a pair of frequency modulated signals, means for introducing a phase shift between the modulating envelopes of said signals, means for impressing one of said signals on the transmission line to be tested, means comprising a modulating circuit for combining the portion of said signal reflected from an irregularity in said line with the second of said signals, and means for selectively detecting the beat frequency from said modulating circuit.

7. A system for locating impedance discontinuities in an electrical transmission line which comprises in combination, a pair of variable frequency oscillators, a pair of generators of linear saw-toothed waves of equal fixed periodicity, means to apply each of said saw-toothed waves to a respectively corresponding one of said oscillators to vary the oscillation frequency of each in conformity with the variations in amplitude of the applied saw-toothed waves, means to connect one of said oscillators to the line to supply oscillations thereto, a modulator, means to apply reflected oscillations received from the line to said modulator, means for concurrently applying oscillations from the other of said oscillators to said modulator whereby said modulator produces beat waves of different frequencies each identified with a particular discontinuity on said line, a band-pass filter connected to said modulator to receive said beat waves, a current indicating device connected to said filter to receive the beat waves transmitted thereby, and means to adjustably shift the phase of one of said applied saw-toothed waves relative to the other of said applied saw-toothed waves, whereby the adjustment of said phase shifting means when said beat waves are transmitted from said modulator through said filter to said current indicating device is correlated with the distance to one of said discontinuities.

DONALD A. QUARLES.

REFERENCES CITED

The following references are of record in the file of this patent:

UNITED STATES PATENTS

| Number | Name | Date |
| --- | --- | --- |
| 2,143,094 | Swift | Jan. 10, 1939 |
| 2,203,750 | Sherman | June 11, 1940 |
| 2,214,130 | Green et al. | Sept. 10, 1940 |
| 2,253,975 | Guanella | Aug. 26, 1941 |
| 2,258,677 | Dresser | Oct. 14, 1941 |
| 2,268,587 | Guanella | Jan. 6, 1942 |
| 2,315,383 | Andrews | Mar. 30, 1943 |